2 Sheets—Sheet 1.

J. B. CREIGHTON.

Railway Day and Night Car.

No. 3,419. Reissued May 4, 1869.

Witnesses:

Wm. A. McKinley

Chas. Parham

Inventor:

George Harding Atty.

N. PETERS, Photo-Lithographer, Washington, D. C.

2 Sheets—Sheet 2.

J. B. CREIGHTON.

Railway Day and Night Car.

No. 3,419. Reissued May 4, 1869.

Witnesses:
Wm A. A. McKinley
Chas Pusham

Inventor:
George Harding Atty.

N. PETERS. Photo-Lithographer, Washington, D. C.

United States Patent Office.

JACOB H. MYERS, OF ROCHESTER, NEW YORK, ASSIGNEE, BY MESNE ASSIGNMENTS, OF J. B. CREIGHTON.

*Letters Patent No.* 20,254, *dated May* 18, 1858; *reissue No.* 602, *dated September* 21, 1858; *reissue No.* 3,419, *dated May* 4, 1869.

RAILWAY DAY AND NIGHT-CAR.

The Schedule referred to in these Letters Patent and making part of the same.

*To all whom it may concern:*

Be it known that I, J. B. CREIGHTON, of Tiffin, in the county of Seneca, in the State of Ohio, did invent certain new and useful Improvements in Railroad-Car Seats for Day and Night-Service, and that the following is a full, clear, and exact description of the same, reference being had to the accompanying drawings, and to the letters of reference marked thereon.

The nature of the said invention consists in the employment of movable backs in the formation of the lower couch, to lie upon at night, and also in forming the upper beds, and concealing the bedding therefor, when not in use, in the spaces between the windows, all of which will be hereinafter fully set forth in the annexed drawings, making a part of this specification.

In the several figures—

Figure 1:
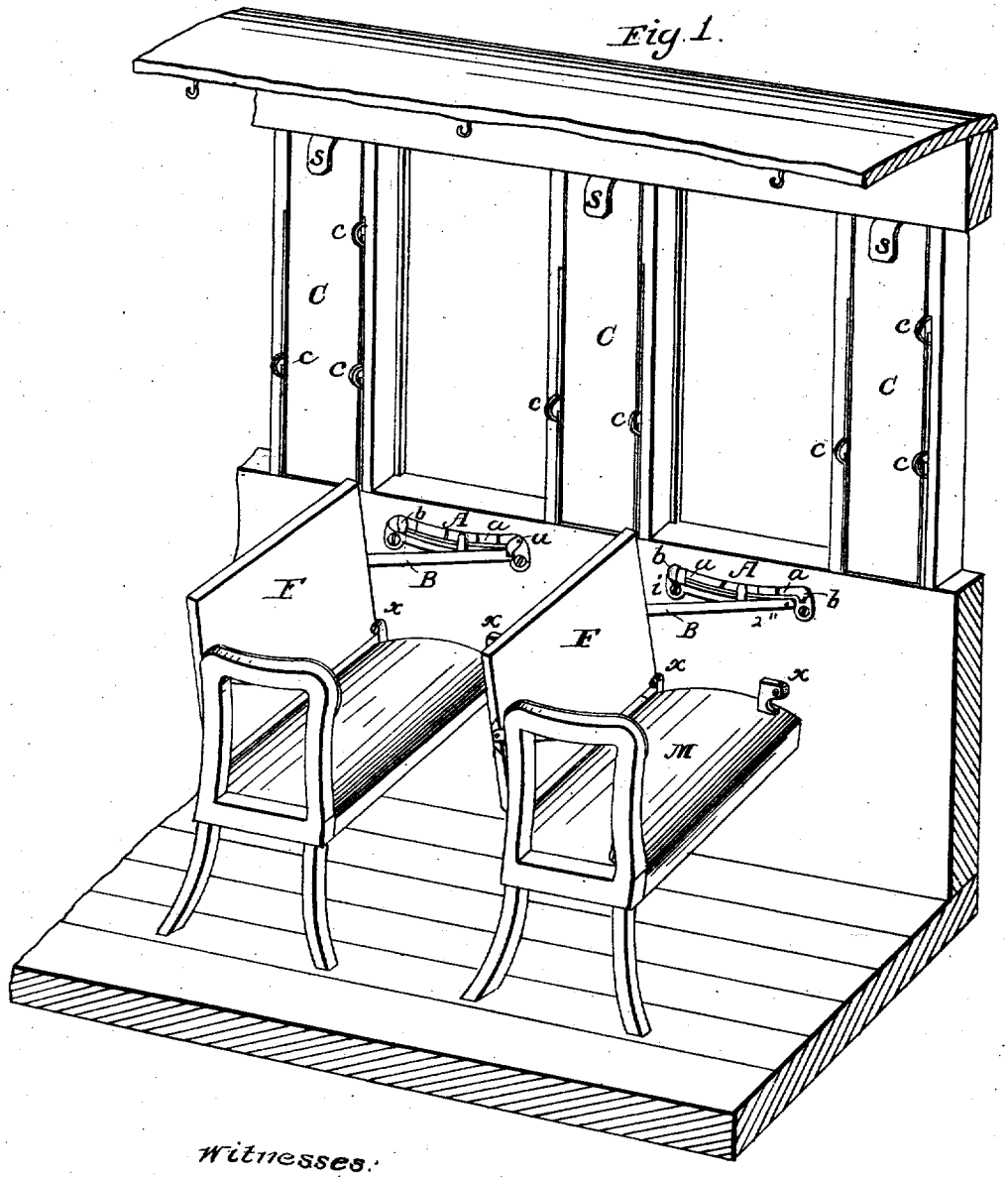
Figure 1 is a perspective view of the arrangement complete for day-service.

M represents the car-seat.

F F represent the reversible and movable backs of said seats.

A A are slotted supporters, which are located on both sides of the seats.

These supporters have three or more stops, marked *i* in the drawing, into which the supporting-pins of the stretchers B fall, said pins being retained in their places by means of eccentric drops *b*.

Said drops move in depressions *a*, upon the upper half of the supporters A, thus making the surfaces of both flush.

When the stretcher-pins rest in the stops *i*, at either end of the supporters A, the backs of the seats will be either erect or horizontal, but resting in the central one, the backs will be elevated at an angle, for the purpose of a head-rest.

When the back is in an erect or inclined position, it rests upon the reversible hooks *x*.

Figure 2:
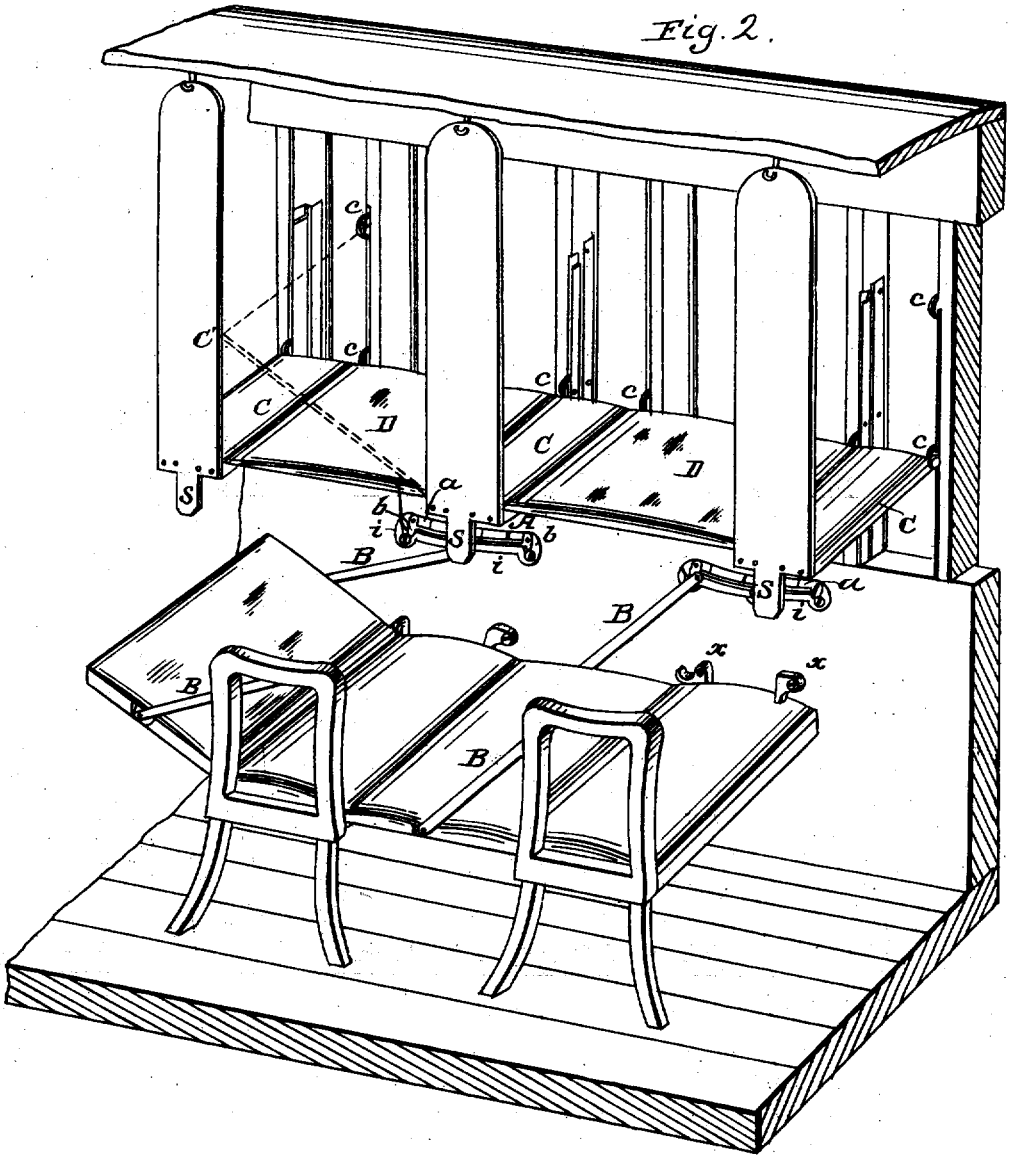
Figure 2 is a perspective view with the arrangement complete for night-service.

In fig. 2 it will be seen that the backs are let down, so as to form a bed. One of the backs may be left inclined, if desired, to form a pillow.

The supporters, the stretchers, the pins, and the stops, may be used in the manner herein shown, or different means may be employed for arriving at the same result, of forming lower couches by means of the backs.

The material for the upper tier of beds is contained in boxes formed by the spaces between the windows.

The canvas D and suspenders S being concealed behind the cushioned trap-board C, to form the beds, the traps C are raised, in perpendicular slots, to resting-places *c*, one end of the suspender S being hooked to the ceiling of the car.

The canvas D is then stretched from trap C to trap C, every alternate one raised to *c'*, as represented in dotted lines, as seen in fig. 2.

Having thus described my invention,

What I claim, and desire to secure by Letters Patent, is—

1. The employment, in combination, of the transverse backs and seats of a passenger railroad-car, to form a berth.

2. The combination of two pairs of contiguous backs and seats, so that when spread out horizontally they shall form a lower berth of the proper length.

3. The employment of the backs of the seats in the formation of lower berths.

4. The formation of an upper removable berth, by distending a canvas from suitable supports on the upper part of the car.

5. The within-described method of forming and concealing, when not in use, in the spaces between the windows, an upper tier of beds, as set forth and for the purpose specified.

J. B. CREIGHTON.
J. H. MYERS.

Witnesses:
HARVEY D. GORDON,
ALEX. GORDON.